May 24, 1955
H. THOMA
2,708,829
EXHAUST PLANT FOR SPINNING MACHINES FOR
CATCHING AND REMOVING THREAD ENDS
Filed Oct. 30, 1951
2 Sheets-Sheet 1
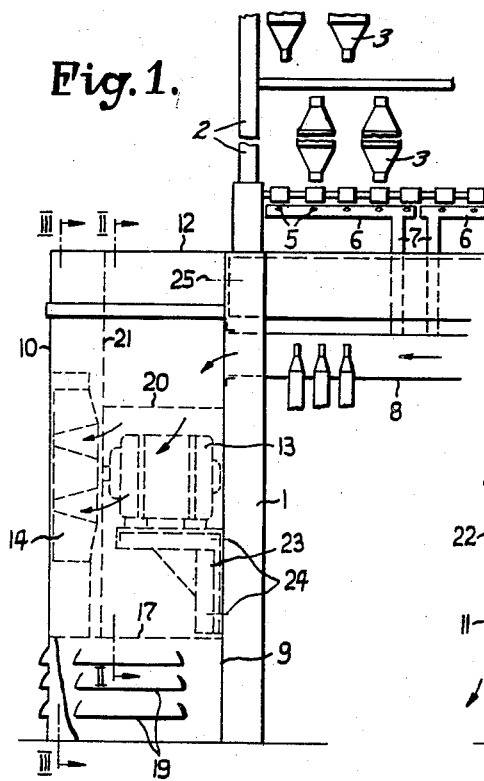
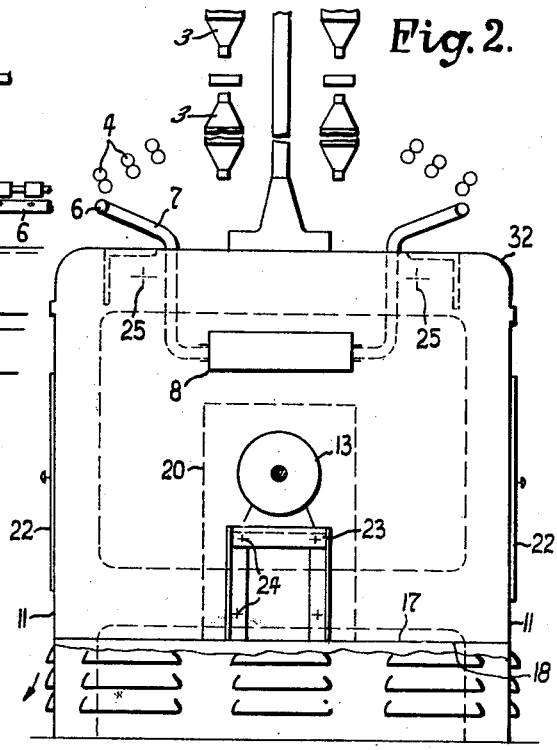
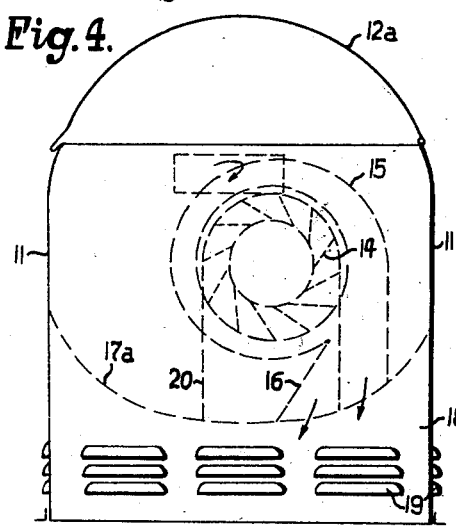
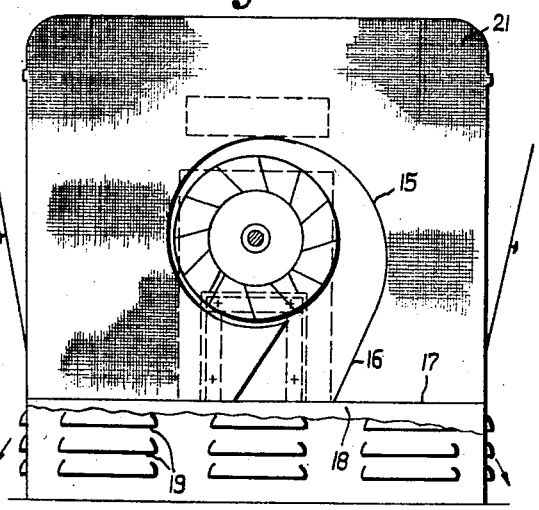
INVENTOR
H. Thoma
BY
ATTORNEYS

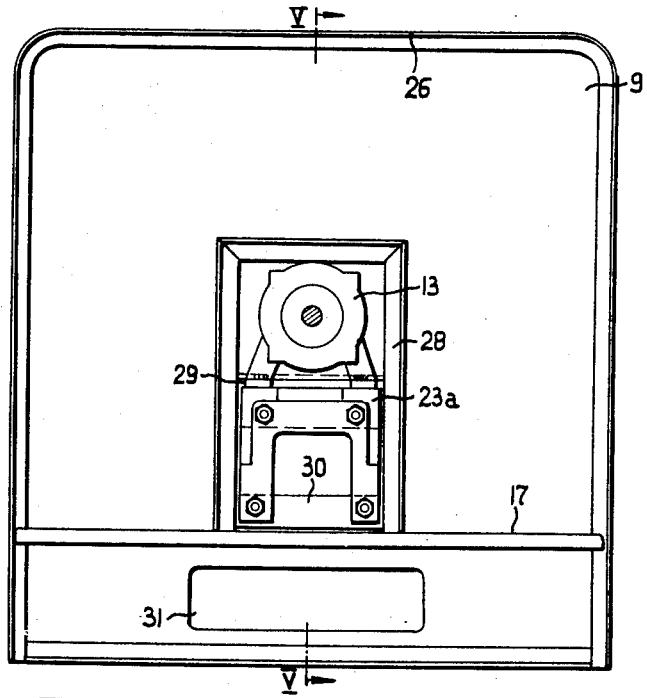
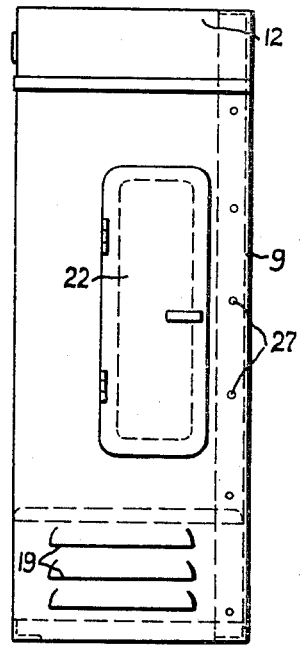
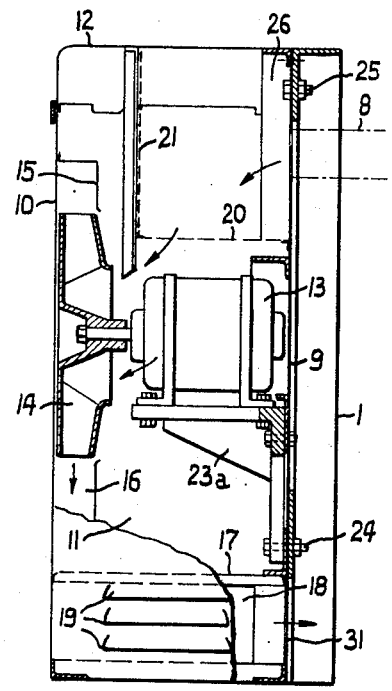

United States Patent Office 2,708,829
Patented May 24, 1955

2,708,829

EXHAUST PLANT FOR SPINNING MACHINES FOR CATCHING AND REMOVING THREAD ENDS

Heinrich Thoma, Zurich, Switzerland

Application October 30, 1951, Serial No. 253,820

5 Claims. (Cl. 57—34.5)

This invention relates to a suction device for collecting and removing broken ends in spinning and the like machines of the type comprising suction heads, which are connected to a collecting conduit extending longitudinally of the machine, and a filter box arranged at the front end of the machine and forming the suction source of the plant. A plant of this general type is described, for instance, in my prior patent specification No. 2,354,893.

In plants of this kind the air is exhausted from the collecting conduit by means of a motor-driven fan wheel, the fibre material being retained by a filter screen and the air being blown into the room.

It is an object of the present invention to provide a filter box and suction device which discharges the air from the filter box without disturbance of the atmosphere in the room which is air-conditioned so as to provide optimum atmospheric conditions for the spinning process.

Another object of the invention is to ensure a better suction with a reduced motor output.

Still another object of the invention is to provide a simple mounting of the driving motor and a simple construction of the filter box.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a side view of the end portion of a spinning machine including the suction plant and the filter box, Fig. 2 is a vertical section on line II—II of Fig. 1, Fig. 3 is a section on line III—III of Fig. 1, Fig. 4 is a front view of a modified form of filter box, Fig. 5 is a vertical section taken at right angles to the showing in Fig. 6, showing constructional details of the device illustrated in Figs. 1 to 3, Fig. 6 is an end view of the device shown in Fig. 5, but with the casing removed, and Fig. 7 is a side view thereof, with the casing attached.

Similar reference numerals denote similar parts in the different views.

In the drawings, the main parts of a spinning machine are diagrammatically indicated. The frame end 1 of the machine bears the creel or spool stand 2 with the roving bobbins 3, and the drawing frame 4. Arranged below this drawing frame 4 are suction heads 6 with nozzles 5 for sucking on the broken ends, said suction heads being connected by pipes 7 to a collecting duct 8 extending longitudinally of the spinning machine. The collecting duct 8 issues into a filter box arranged on the front end of the spinning machine and comprising a rear wall 9, a front wall 10, the two side walls 11 and a cover 12. The collecting duct 8 is connected to the rear wall 9 of the filter box which is directed towards the spinning machine.

Disposed within the filter box is a fan or blower wheel 14 driven by an electric motor 13, and a fan casing 15, Fig. 3, having a downwardly directed exhaust or blast pipe 16 issuing into a bottom chamber 18 of the filter box which bottom chamber is formed by a horizontal partition wall 17. Arranged in the side walls of the filter box just above the bottom thereof, are lateral air discharge openings 19 which may be designed in such a way that the air is blown out at a point close to the floor. Preferably, the slots are formed by sheet metal strips 19 which are partly cut out of the sheet metal wall by punching so as to form downwardly directed air discharge openings, which are conveniently fashioned in a Venetian blind arrangement, in such a way that the air is blown out on to the floor, in the direction as indicated by the arrows in Fig. 3. This offers the advantage that the air-conditioning plant is in no way disturbed by the air discharged from the fan 14 and the spinning process, therefore, is not affected by this blast of air.

It will also be apparent from the drawing that the collecting duct 8 opens directly as shown by arrow A into the rear wall 9 of the filter box. Owing to this arrangement and the provision of the fan wheel in the opposite front wall 10 of the filter box the air sucked on by the collecting duct is only slightly deflected and flows to the fan wheel 14 substantially in the flowing direction defined by the collecting duct. This desirable air supply produces a high suction output. It is accordingly possible to select a smaller motor 13 and this facilitates the arrangement of the said motor inside the filter box, so that the driving motor does not protrude and the filter box can be connected directly to the frame end 1. The flow of the suction air to the fan wheel 14 is not prevented by this small motor. Moreover, in my novel arrangement the driving motor 13 is disposed in the flow of suction air. The fan formerly necessary in electric motors for cooling purposes is thus also dispensed with. In order to protect the motor 13 against fibrous materials which are drawn in, there is provided a filter screen 20. Moreover, a vertical filter screen 21 is arranged in the filter box before the fan wheel 14 for retaining the fibrous material which can be removed from the filter box by lateral flaps 22.

The fan wheel 14 is mounted directly on the motor shaft, that is to say, it is overhung. The motor 13 is mounted on a bracket 23 which may consist of section irons which are welded together. The bracket is connected to the rear wall 9 of the filter box. As shown in the drawing, this novel arrangement of the motor permits the bracket with the rear wall 9 of the filter box to be fixed to the frame end 1 of the spinning machine. The fixing points are indicated at 24 and 25. The weight of the motor-fan unit is thus directly transmitted to the frame end 1, so that the filter box parts 10, 11, 12 can be of a very light construction. Moreover, a quiet run of the motor-fan unit is ensured by this mounting.

Referring now to Figs. 5 to 7, it will be seen that the filter box is of a very simple design, comprising three main elements: a back wall 9, a detachable hood 12, and side walls 11 formed in one U-shaped piece with the front wall 10. Secured to the back wall 9 is an angle iron frame 26. The U-element 10, 11 is connected to the back wall 9 by screws 27, Fig. 7.

Fixedly secured to the back wall 9 is moreover a stiffening or reinforcing frame 28, advantageously having an angle profile and provided with transverse struts or braces 29 and 30. The bracket 23a carrying the motor 13 is mounted in this stiffening frame, so that the load of the motor and fan wheel unit is transmitted to the back wall 9 through the bracket 23a and the stiffening frame 28. Of course, the bracket and back wall may additionally be secured to the frame end 1 in the manner as shown in Figs. 1 and 2.

It will be understood that my novel construction offers the advantage that the filter box has smooth, closed walls, while hitherto openings with closing covers had to be provided in the front and rear walls for inserting or removing the motor and the fan wheel. In spite of this closed construction the motor and the fan wheel are easily accessible, since the coherent filters 21, 29 can be drawn out in an upward direction on removal of the hood 12. Furthermore, the U-member 10, 11, can be drawn off in a forward direction after undoing the screws 27. To this end, an opening of a corresponding size is provided in the fan casing 15 for passage of the fan wheel 14.

It is also contemplated to provide a larger air discharge opening 31 on the rear wall 9 for discharge of the air below the machine in the direction of the arrow. The air discharge being shown by the arrow in Fig. 5.

It will also be seen from the drawing that the filter box is adapted to the shape and size of the frame end of the machine, i. e., it corresponds to the height and width of the frame end and has also corresponding roundings at 32, Fig. 2.

The suction output may be further increased by providing a filter box whose suction chamber has a round cross section in a plane disposed perpendicularly to the collecting duct 8, as shown in Fig. 4. The top end of the suction chamber in this case is defined by a curved hood 12a, the sides are formed by the wall parts 11 and the lower part is defined by a curved partition wall 17a separating the suction chamber from the bottom chamber 18. This special shaping of the suction chamber of the filter box is provided because the fan wheel 14 produces a spinning motion, i. e. a rotation, of the air current. The suction chamber, therefore, is rounded off to prevent losses due to eddy formation.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. An assembly for collecting and removing thread ends in spinning and similar machines having a collecting conduit extending longitudinally of the machine, suction heads communicating with the conduit and a filter box located at the frame end of the machine, the filter box including side walls, a front wall, a rear wall, a bottom wall and a top, an electric motor within the box, a fan wheel operatively connected to the motor, a support for the motor secured to the rear wall of the box, means to connect the said support and rear wall directly to the frame end of the machine whereby all forces are transmitted directly to the frame end, a filter screen within the box between the motor and the fan wheel and mounted in substantial parallelism to the front wall, a further filter screen mounted within the box above the motor for protecting the motor from foreign matter, a fan wheel casing adjacent the front wall surrounding the fan wheel, means defining a chamber within the box intermediate the bottom wall and the motor, an exhaust conduit leading from the fan wheel casing and in communication with said chamber, and means defining air discharge openings in certain of the walls of the box, the said air discharge openings being in communication with the said chamber.

2. An assembly as defined in claim 1 wherein the said air discharge openings are arranged to discharge the air downwardly at an angle to the floor.

3. An assembly as defined in claim 1 wherein the rear frame wall is provided with a reinforcing member, the motor support being carried by the reinforcing member and means to secure the reinforcing member to the frame end of the machine.

4. An assembly as defined in claim 1 wherein the front and side walls are defined by a U-shaped member secured to the rear wall and the top is a detachable hood connected to such walls.

5. An assembly as defined in claim 4 wherein the filters within the box may be removed therefrom when the hood is detached from the box.

References Cited in the file of this patent

UNITED STATES PATENTS 2,583,849   Just _____ Jan. 29, 1952

FOREIGN PATENTS 271,343   Switzerland _____ Jan. 16, 1951